United States Patent
Meyer et al.

(10) Patent No.: US 8,153,098 B2
(45) Date of Patent: Apr. 10, 2012

(54) SURFACE-MODIFIED INDIUM-TIN OXIDES

(75) Inventors: Jurgen Meyer, Stockstadt (DE); Gunther Michael, Karlstein (DE)

(73) Assignee: Evonik Degussa GmbH, Essen (DE)

( * ) Notice: Subject to any disclaimer, the term of this patent is extended or adjusted under 35 U.S.C. 154(b) by 828 days.

(21) Appl. No.: 11/667,068

(22) PCT Filed: Oct. 29, 2005

(86) PCT No.: PCT/EP2005/011605
§ 371 (c)(1),
(2), (4) Date: Oct. 15, 2007

(87) PCT Pub. No.: WO2006/058588
PCT Pub. Date: Jun. 8, 2006

(65) Prior Publication Data
US 2008/0166289 A1    Jul. 10, 2008

(30) Foreign Application Priority Data
Nov. 30, 2004  (DE) .......................... 10 2004 057 707

(51) Int. Cl.
*C01G 17/02*     (2006.01)

(52) U.S. Cl. ..................................... 423/594.9; 502/351
(58) Field of Classification Search .............. 423/594.9; 502/351, 352
See application file for complete search history.

(56) References Cited

U.S. PATENT DOCUMENTS

| | | |
|---|---|---|
| 5,286,571 A | 2/1994 | Mirkin et al. |
| 2002/0019461 A1 | 2/2002 | Yashiro et al. |
| 2003/0039607 A1* | 2/2003 | Yanai et al. .................... 423/593 |

FOREIGN PATENT DOCUMENTS

JP     2000133064    *    5/2000

OTHER PUBLICATIONS

International Search Report dated Jan. 17, 2006, issued in PCT/EP2005/011605.
Written Opinion of the International Searching Authority.

* cited by examiner

*Primary Examiner* — Edward Johnson
(74) *Attorney, Agent, or Firm* — Smith, Gambrell & Russell, LLP

(57) ABSTRACT

Surface-modified indium-tin oxides are produced by mixing the oxides with the surface-modifying agent in liquid or vapor form and heat treating the mixture.

They can be used to produce coating systems.

7 Claims, No Drawings

SURFACE-MODIFIED INDIUM-TIN OXIDES

The invention concerns surface-modified indium-tin oxides, a process for their production and their use.

Indium-tin oxides are known from DE 101 29 376. They are produced by mixing a solution of an indium salt with a solution of a tin salt, atomising this solution mixture and pyrolysing the atomised solution mixture.

The invention provides surface-modified indium-tin oxides, which are characterised by:

| | |
|---|---|
| BET specific surface areas: | 0.1-299 m²/g |
| pH: | 2.5-9.5 |
| C content: | 0.1 to 15% |

The invention also provides a process for producing the surface-modified indium-tin oxides, which is characterised in that the oxides are sprayed with the surface-modifying agent whilst being mixed and the mixture is then heat treated at a temperature of 50 to 400° C. for a period of 1 to 6 hours.

The invention also provides another process for producing the surface-modified indium-tin oxides according to the invention, which is characterised in that the oxides are treated with the surface-modifying agent in vapour form and the mixture is then heat treated at a temperature of 50 to 800° C. for a period of 0.5 to 6 hours.

The heat treatment can take place under protective gas, such as nitrogen for example.

The surface modification can be performed in heatable mixers and dryers with sprayers, continuously or in batches. Suitable devices can be, for example: ploughshare mixers, plate dryers, fluidised-bed or flash dryers.

The indium-tin oxides known from DE 101 29 376 can be used as oxides.

An indium-tin oxide which is characterised by the following physico-chemical parameters can be used according to the invention:

| | |
|---|---|
| Average primary particle size determined by TEM | 1 to 200 nm |
| BET surface area (DIN 66131) | 0.1 to 300 m²/g |
| XRD structure | cubic indium oxide, tetragonal tin oxide |
| Mesopores according to BJH method (DIN 66134) | 0.03 ml to 0.30 ml/g |
| Macropores (DIN 66133) | 1.5 to 5.0 ml/g |
| Bulk density (DIN-ISO 787/XI) | 50 to 2000 g/l |

The indium-tin oxide for use according to the invention can be doped with the following substances in the form of oxides and/or of elemental metals:

| | |
|---|---|
| aluminium, | yttrium, |
| magnesium, | tungsten, |
| silicon, | vanadium, |
| gold, | manganese, |
| cobalt, | iron, |
| copper, | silver, |
| palladium, | ruthenium, |
| nickel, | rhodium, |
| cadmium, | platinum, |
| antimony, | osmium, |
| cerium, | iridium, |
| zirconium | calcium |
| titanium | zinc | wherein the corresponding salts can be used as the starting substance.

The indium-tin oxide for use according to the invention can be produced by mixing a solution of an indium salt with a solution of a tin salt, optionally adding a solution of at least one doping component, atomising this solution mixture, pyrolysing the atomised solution mixture and separating the product obtained from the waste gases.

Inorganic compounds such as chlorides, nitrates, for example, and organometallic precursors such as acetates, alcoholates, for example, can be used as salts.

The solution mixture can additionally contain a dispersion of a pyrogenically produced silica, which can optionally be hydrophobed, or a silica sol. It must be borne in mind here that the silica acts as a nucleus of crystallisation and as such the maximum particle size of the silica is predetermined by the maximum particle size of the end product.

The solution can optionally contain water, water-soluble organic solvents such as alcohols, for example ethanol, propanol, and/or acetone.

The solution can be atomised using an ultrasonic nebuliser, ultrasonic atomiser, two-fluid nozzle or three-fluid nozzle.

If an ultrasonic nebuliser or ultrasonic atomiser is used, the aerosol obtained can be mixed with the carrier gas and/or $N_2/O_2$ air which is supplied to the flame.

If a two-fluid or three-fluid nozzle is used, the aerosol can be sprayed directly into the flame.

Non-water-miscible organic solvents such as ethers can also be used.

Separation can be carried out with a filter or cyclone.

Pyrolysis can be carried out in a flame generated by burning hydrogen/air and oxygen. Methane, butane and propane can be used in place of hydrogen.

Pyrolysis can also be carried out using an externally heated oven.

A fluidised-bed reactor, a revolving tube or a pulsed reactor can also be used.

EXAMPLES

The process parameters for producing the indium-tin oxides for use according to the invention are set out in the table below:

| | | Production Exp. no.: | |
|---|---|---|---|
| | | PH04408 | PH04410 |
| Metal | Composition | In/Sn/Mg/Al | In/Sn/Au |
| | Type | All chlorides | All chlorides |
| | wt. % | 93/5/0.3/1.7 | 94/5.5/0.5 |
| Solution | Throughput g/h | 560 | 570 |
| | Dissolved in conc. % | H2O 3 | H2O 3 |
| Nebulisation | Ultrasonic | x | |
| Nozzle | 2-fluid | | x |
| Gas quantity m³/h | H2 | 1.2 | 1.2 |
| | N2/O2 | 0/0.3 | 0/0.2 |
| | Atomisation | 1.5 | 1.5 |
| | Secondary | | 1.5 |
| | Primary | 3 | 1.6 |
| | Lambda | 2.24 | 1.93 |
| Reactor temp. ° C. | T 1 | 751 | 781 |
| | T 2 | 720 | 765 |
| | T 3 | 721 | 749 |
| | Filter | 241 | 240 |

The physico-chemical parameters of the products obtained are set out in the tables below:

$x = 1.2$
$y = 1.2$

| ITO substance data analysis | | | | | |
|---|---|---|---|---|---|
| | | Exp. no.: | | | |
| | | PH04408 | PH04410 | PH04411 | PH04412 |
| XRD phase analysis | | cub. In2O3 | cub. In2O3 | cub. In2O3 | cub. In2O3 |
| Particle size by | BET [nm] | 31 | 17 | 15 | 15 |
| | XRD [nm] | 32 | 20 | 19 | 19 |
| Distribution by TEM | | homogeneous distrib. with spheres | | | |
| Particle diam. | DN [nm] | 21.04 | | | |
| Spec. surf. area | OEM [m2/g] | 26.319 | | | |
| Mol. number dist. | D50 (A) [nm] | 17.516 | | | |
| Mol. weight dist. | D50(g) [nm] | 32.701 | | | |
| 90% spec. number distrib. | nm | 9.87-36.65 | | | |
| 90% spec. weight distrib. | nm | 14.67-87.66 | | | |
| Overall spread | nm | 7.40-116.6 | | | |
| BET spec. surface area | (m2/g) | 26 | 49 | 54 | 55 |
| Micropores (de Boer's t-plot) | | none | none | none | none |
| Metal | Composition | In/Sn/Mg/Al | In/Sn/Au | In/Sn/Au | In/Sn/Au |
| | wt. % | 93/5/0.3/1.7 | 94/5.5/0.5 | 90/8/1 | 90/7/3 |
| RFA | % | 89/5.1/0.5/3.2 | 90.9/7.6 | 89/9 | 88.7/8.75 |
| Spec. resistance (ohm) Compressed density | (at 0.5 g/cm3) | 1.00E+03 | 1.00E+04 | 1.00E+04 | 1.00E+05 |
| Surface analysis (XPS) | Metal | In/Sn/Au | | | |
| | atom % | 25/0.96/0.25 | | | |
| | In/Sn | 26.04 | | | |
| C content ppm | | 1000 | | | |
| Cilas d = 50 in μm | without US | | | | |
| | with US 120 sec. | 1.56 | 1.2 | | 1.1 |
| L/a/b values | | 85.48/−2.28/22.08 | 76.15/1.88/20.01 | 66.31/4.72/11.16 | 52.2/7.16/0.2 |
| Colour | | yellowish green | yellow green orange | yellow green pink | violet |
| Density g/l | | | 150 | 280 | 253 |

The products for use according to the invention display a cubic indium oxide and a tetragonal tin oxide.

Silanes can be used as surface treatment agents. Such silanes can be the following silanes, which can be used both individually and mixed together:

a) Organosilanes of the type $(RO)_3Si(C_nH_{2n+1})$ and $(RO)_3Si(C_nH_{2n-1})$
   R=alkyl, such as e.g. methyl, ethyl, n-propyl, i-propyl, butyl
   n=1-20 b) Organosilanes of the type $R'_x(RO)_ySi(C_nH_{2n+1})$ and $R'x(RO)_ySi(C_nH_{2n-1})$
   R=alkyl, such as e.g. methyl, ethyl, n-propyl, i-propyl, butyl
   R'=alkyl, such as e.g. methyl, ethyl, n-propyl, i-propyl, butyl
   R'=cycloalkyl
   n=1-20
   x+y=3 c) Organohalosilanes of the type $X_3Si(C_nH_{2n+1})$ and $X_3Si(C_nH_{2n-1})$
   X=Cl, Br
   n=1-20 d) Organohalosilanes of the type $X_2(R')Si(C_nH_{2n+1})$ and $X_2(R')Si(C_nH_{2n-1})$
   X=Cl, Br
   R'=alkyl, such as e.g. methyl, ethyl, n-propyl, i-propyl, butyl
   R'=cycloalkyl
   n=1-20 e) Organohalosilanes of the type $X(R')_2Si(C_nH_{2n+1})$ and $X(R')_2Si(C_nH_{2n-1})$
   X=Cl, Br
   R'=alkyl, such as e.g. methyl, ethyl, n-propyl, i-propyl, butyl
   R'=cycloalkyl
   n=1-20 f) Organosilanes of the type $(RO)_3Si(CH_2)_m$—R'
   R=alkyl, such as methyl, ethyl, propyl m=0.1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$, —N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH
—NR'R"R''' (R'=alkyl, aryl; R"=H, alkyl, aryl; R'''=H, alkyl, aryl, benzyl, $C_2H_4$NR''''R''''' where R''''=H, alkyl and R'''''=H, alkyl)

g) Organosilanes of the type (R")$_x$(RO)$_y$Si($CH_2$)$_m$—R'
R"=alkyl x+y=3
=cycloalkyl x=1.2
y=1.2
m=0.1 to 20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$, —N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$, where R can be methyl, ethyl, propyl, butyl and x=1 or 2
—SH
—NR'R"R''' (R'=alkyl, aryl; R"=H, alkyl, aryl; R'''=H, alkyl, aryl, benzyl, $C_2H_4$NR''''R''''' where R''''=H, alkyl and R'''''=H, alkyl)

h) Organohalosilanes of the type $X_3$Si($CH_2$)$_m$—R'
X=Cl, Br
m=0.1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$, where R can be methyl, ethyl, propyl, butyl and x=1 or 2
—SH i) Organohalosilanes of the type (R)$X_2$Si($CH_2$)$_m$—R'
X=Cl, Br
R=alkyl, such as methyl, ethyl, propyl
m=0.1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$, —N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$—($CH_2$)$_3$Si(OR)$_3$, where R can be methyl, ethyl, propyl, butyl and x=1 or 2
—SH j) Organohalosilanes of the type (R)$_2$X Si($CH_2$)$_m$—R'
X=Cl, Br
R=alkyl
m=0.1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$, where R can be methyl, ethyl, propyl, butyl and x=1 or 2
—SH k) Silazanes of the type

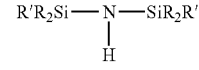

R=alkyl, vinyl, aryl
R'=alkyl, vinyl, aryl l) Cyclic polysiloxanes of the type D 3, D 4, D 5, wherein D 3, D 4 and D 5 are understood to be cyclic polysiloxanes having 3, 4 or 5 units of the type —O—Si($CH_3$)$_2$—, e.g. octamethyl cyclotetrasiloxane=D 4

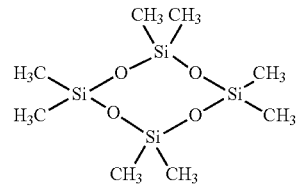

m) Polysiloxanes or silicone oils of the type

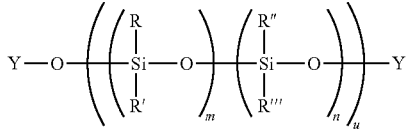

$m = 0, 1, 2, 3, ... \infty$
$n = 0, 1, 2, 3, ... \infty$
$u = 0, 1, 2, 3, ... \infty$ Y = $CH_3$, H, $C_nH_{2n+1}$  n = 1-20
Y = Si($CH_3$)$_3$, Si($CH_3$)$_2$H
Si($CH_3$)$_2$OH, Si($CH_3$)$_2$(O$CH_3$)
Si($CH_3$)$_2$($C_nH_{2n+1}$)  n = 1-20

R=alkyl, such as $C_nH_{2n+1}$, wherein n=1 to 20, aryl, such as phenyl and substituted phenyl radicals, ($CH_2$)$_n$—$NH_2$, H
R'=alkyl, such as $C_nH_{2n+1}$, wherein n=1 to 20, aryl, such as phenyl and substituted phenyl radicals, $(CH_2)_n$—$NH_2$, H
R''=alkyl, such as $C_nH_{2n+1}$, wherein n=1 to 20, aryl, such as phenyl and substituted phenyl radicals, $(CH_2)_n$—$NH_2$, H
R'''=alkyl, such as $C_nH_{2n+1}$, wherein n=1 to 20, aryl, such as phenyl and substituted phenyl radicals, $(CH_2)_n$—$NH_2$, H The following substances can preferably used as surface-modifying agents:
Octyl trimethoxysilane, octyl triethoxysilane, hexamethyl disilazane, 3-methacryloxypropyl trimethoxysilane, 3-methacryloxypropyl triethoxysilane, hexadecyl trimethoxysilane, hexadecyl triethoxysilane, dimethyl polysiloxane, glycidyloxypropyl trimethoxysilane, glycidyloxypropyl triethoxysilane, nonafluorohexyl trimethoxysilane, tridecafluorooctyl trimethoxysilane, tridecafluorooctyl triethoxysilane, aminopropyl triethoxysilane.

Octyl trimethoxysilane, octyl triethoxysilane and dimethyl polysiloxanes can particularly preferably be used.

The surface-modified indium-tin oxides according to the invention can be used for producing coating systems, for example, which are distinguished by IR protection.

The surface-modified indium-tin oxides according to the invention are distinguished by a pronounced transparency.

Examples

For the purposes of surface modification the oxides are placed in a mixer and sprayed first optionally with water and then with the surface-modifying agent whilst undergoing intensive mixing. On completion of spraying, mixing can be continued for a further 15 to 30 minutes and the mixture is then conditioned for 1 to 4 hours at 50 to 400° C.

The water used can be acidulated with an acid, for example hydrochloric acid, to obtain a pH of 7 to 1. The silanising agent used can be dissolved in a solvent, such as ethanol for example. An indium-tin oxide (VP AdNano ITO R 50) was used to produce the examples. Physico-chemical data for the oxide used (UB PH 13195) can be obtained from Table 1. Details of the method together with data for the surface-modified oxides are set out in Tables 2 and 3.

TABLE 1

| Specific surface area (BET) | $m^2/g$ | 48 |
|---|---|---|
| pH, 4% in water | | 3.3 |
| Compacted bulk density | g/l | 195 |
| Loss on drying | % | 0.9 |

TABLE 2

Production of the surface-modified oxides

| Example | Surface-modifying agent | Parts SMA*/ 100 parts oxide | Parts $H_2O$/ 100 parts oxide | Cond. temp. [° C.] | Cond. time [h] |
|---|---|---|---|---|---|
| 1 | A | 6 | 0.5 | 120 | 2 |
| 2 | A | 4 | | 120 | 2 |
| 3 | B | 5 | | 120 | 2 |
| 4 | C | 4 | 0.5 | 120 | 2 |
| 5 | D | 4 | 0.5** | 120 | 2 |

*SMA = Surface-modifying agent
**0.001n HCl were used in place of $H_2O$
Surface-modifying agents:
A = octyl trimethoxysilane
B = 3-methacryloxypropyl trimethoxysilane
C = hexamethyl disilazane
D = hexadecyl trimethoxysilane

TABLE 3

Physico-chemical data for the surface-modified oxides

| Example | BET specific surface area [$m^2/g$] | pH | C content [%] |
|---|---|---|---|
| 1 | 41 | 3.3 | 2.4 |
| 2 | 45 | 3.3 | 1.7 |
| 3 | 44 | 3.3 | 1.7 |
| 4 | 47 | 4.7 | 0.2 |
| 5 | 40 | 3.2 | 3.2 |

The invention claimed is:

1. Surface-modified particles containing pyrogenically produced indium-tin oxides, characterised by

| BET specific surface areas: | 0.1-299 $m^2/g$ |
|---|---|
| pH: | 2.5-9.5 |
| C content: | 0.1 to 15% | obtained by treating pyrogenically produced oxides with silanes as surface-modifying agents whilst being mixed and heating the mixture at a temperature of 50 to 400° C. for a period of 1 to 6 hours.

2. Process for producing the surface-modified particles containing indium-tin oxides as defined in claim 1, comprising spraying pyrogenically produced indium-tin oxides with silanes as surface-modifying agents whilst being mixed and heat treating the mixture at a temperature of 50 to 400° C. for a period of 1 to 6 hours.

3. Process for producing the surface-modified particles containing indium-tin oxides as defined in claim 1, comprising spraying pyrogenically produced indium-tin oxides with silanes as surface-modifying agents in vapour form whilst being mixed and heat treating the mixture at a temperature of 50 to 800° C. for a period of 0.5 to 6 hours.

4. A coating composition comprising the surface-modified particles containing indium-tin oxides of claim 1 and a carrier.

5. The surface-modified particles containing pyrogenically produced indium-tin oxides according to claim 1, wherein the silane is selected from the group consisting of octyl trimethoxysilane, octyl triethoxysilane, hexamethyl disilazane, 3-methacryloxypropyl trimethoxysilane, 3-methacryloxypropyl triethoxysilane, hexadecyl trimethoxysilane, hexadecyl triethoxysilane, dimethyl polysiloxane, glycidyloxypropyl trimethoxysilane, glycidyloxypropyl triethoxysilane, nonafluorohexyl trimethoxysilane, tridecafluorooctyl trimethoxysilane, tridecafluorooctyl triethoxysilane, and aminopropyl triethoxysilane.

6. The process according to claim 3, wherein the silane is selected from the group consisting of octyl trimethoxysilane, octyl triethoxysilane, hexamethyl disilazane, 3-methacryloxypropyl trimethoxysilane, 3-methacryloxypropyl triethoxysilane, hexadecyl trimethoxysilane, hexadecyl triethoxysilane, dimethyl polysiloxane, glycidyloxypropyl trimethoxysilane, glycidyloxypropyl triethoxysilane, nonafluorohexyl trimethoxysilane, tridecafluorooctyl trimethoxysilane, tridecafluorooctyl triethoxysilane, and aminopropyl triethoxysilane.

7. The process according to claim 4, wherein the silane is selected from the group consisting of octyl trimethoxysilane, octyl triethoxysilane, hexamethyl disilazane, 3-methacryloxypropyl trimethoxysilane, 3-methacryloxypropyl triethoxysilane, hexadecyl trimethoxysilane, hexadecyl triethoxysilane, dimethyl polysiloxane, glycidyloxypropyl trimethoxysilane, glycidyloxypropyl triethoxysilane, nonafluorohexyl trimethoxysilane, tridecafluorooctyl trimethoxysilane, tridecafluorooctyl triethoxysilane, and aminopropyl triethoxysilane.

* * * * *